US010689032B2

(12) United States Patent
 Khoury (10) Patent No.: US 10,689,032 B2
(45) Date of Patent: Jun. 23, 2020

(54) STEERING STABILIZING MEANS

(71) Applicant: SAF-HOLLAND GmbH, Bessenbach (DE)

(72) Inventor: Jean Khoury, Dreieich (DE)

(73) Assignee: SAF-HOLLAND GmbH, Bessenbach (DE)

( * ) Notice: Subject to any disclaimer, the term of this patent is extended or adjusted under 35 U.S.C. 154(b) by 182 days.

(21) Appl. No.: 15/549,004

(22) PCT Filed: Feb. 4, 2016

(86) PCT No.: PCT/EP2016/052324
§ 371 (c)(1),
(2) Date: Aug. 4, 2017

(87) PCT Pub. No.: WO2016/124662
 PCT Pub. Date: Aug. 11, 2016

(65) Prior Publication Data
 US 2018/0009475 A1  Jan. 11, 2018

(30) Foreign Application Priority Data
 Feb. 6, 2015 (DE) .................. 10 2015 202 191

(51) Int. Cl.
 *B62D 13/04* (2006.01)
 *B62D 7/14* (2006.01)
 (Continued)

(52) U.S. Cl.
 CPC ............. *B62D 13/04* (2013.01); *B62D 7/144* (2013.01); *F16F 13/007* (2013.01)

(58) Field of Classification Search
 CPC . B62D 7/02; B62D 7/163; B62D 7/14; B62D 7/142; B62D 7/144; B62D 7/20;
 (Continued)

(56) References Cited

U.S. PATENT DOCUMENTS 1,401,398 A * 12/1921 Duncan .................... B62D 7/22
 280/89.11
1,868,912 A   7/1932 Plank
 (Continued)

FOREIGN PATENT DOCUMENTS

CN  102427988   4/2012
DE  19654241    11/1997
 (Continued)

OTHER PUBLICATIONS

European Patent Office; International Search Report; dated Apr. 19, 2016.

*Primary Examiner* — Barry Gooden, Jr.
(74) *Attorney, Agent, or Firm* — Price Heneveld LLP (57) ABSTRACT

An actuating unit for use in a steering stabilizing apparatus that includes a housing, a first transmission element and a second transmission element, wherein the first transmission element and the second transmission element protrude into the housing from the outside and are configured to be displaced along a restoring axis, wherein the first transmission element engages a first pressure element at the first end of the first transmission element and wherein the second transmission element engages a second pressure element at the first end of the second transmission element, and wherein the first pressure element and the second pressure element are disposed within a chamber of the housing and are subjected by a restoring arrangement to a restoring force acting along the restoring axis.

22 Claims, 4 Drawing Sheets

(51) Int. Cl.
  *B62D 7/22* (2006.01)
  *F16F 13/00* (2006.01)

(58) Field of Classification Search
  CPC .......... B62D 7/22; B62D 7/226; B62D 7/228; B62D 13/00; B62D 13/04; B60G 7/04; F16F 13/007
  USPC ...................................................... 280/89.11
  See application file for complete search history.

(56) References Cited

U.S. PATENT DOCUMENTS

| | | | | |
|---|---|---|---|---|
| 4,970,646 A * | 11/1990 | Sugasawa | ................. | B62D 7/14 180/415 |
| 5,364,116 A * | 11/1994 | Houle | ................. | B62D 13/025 280/426 |
| 6,422,582 B1 | 7/2002 | Howard | | |
| 7,086,660 B2 * | 8/2006 | Bruening | ............. | B62D 13/025 280/442 |
| 7,789,404 B2 * | 9/2010 | Rummel | ................. | B62D 7/22 280/89.11 |
| 8,628,100 B2 * | 1/2014 | Buttner | ................. | B62D 7/144 280/89 |
| 2004/0000772 A1 | 1/2004 | Bruening et al. | | |
| 2004/0188968 A1 * | 9/2004 | Warner | ................. | B62D 13/04 280/89.11 |
| 2012/0091678 A1 * | 4/2012 | Buttner | ................. | B62D 7/144 280/90 |
| 2014/0183802 A1 * | 7/2014 | Kim | ..................... | F16F 13/007 267/140.13 |
| 2015/0321693 A1 * | 11/2015 | Buttner | ................. | B62D 7/144 180/440 |
| 2016/0130002 A1 * | 5/2016 | Cuddy | ................. | B64D 11/00 267/140.13 |
| 2018/0148090 A1 * | 5/2018 | Christ | ................... | B62D 7/144 |

FOREIGN PATENT DOCUMENTS

| | | |
|---|---|---|
| DE | 20 2007 015 502 | 2/2008 |
| DE | 10 2012 025604 | 12/2013 |
| DE | 10 2012 209690 | 12/2013 |

* cited by examiner

STEERING STABILIZING MEANS

BACKGROUND OF THE INVENTION

The present invention concerns a steering stabilizing means as well as an actuating unit for use as a steering stabilizing means.

In the field of commercial vehicles, the use of self-steering axles, in particular with multi-axle trailers for commercial vehicles, is widely accepted. Owing to the self-steering axles, the tire wear when cornering a multi-axle commercial vehicle or commercial vehicle trailer is significantly reduced and the maneuverability thereof is improved. Owing to the simple manufacture and the simple handling thereof, with trailers for commercial vehicles in particular, unsteered self-steering axles are used, which means that no control of the steering movements of the self-steering axle is necessary. Said self-steering axles are brought into the corresponding correct steering position in a simple manner by the lateral forces acting on the tire of the wheel. These are also referred to as "friction-steered axles". Such friction-steered axles require a stabilizing system, in particular for fast straight-line travel, so that they do not oscillate unintentionally and endanger safety of straight-line travel of the commercial vehicle. Such steering stabilizing systems have on the one hand the function of bringing the steering arm of the self-steering axle back to the straight-ahead position, and on the other hand preferably to damp rapid rotation of the steering arms. From the prior art, to date only systems are known with which the restoring and damping function is effected by a number of different elements that have to be attached in the region of the chassis of the commercial vehicle. This takes up a very large installation space combined with large weight of the various subsystems that undertake the restoring and damping of the self-steering axle. Moreover, the assembly and maintenance effort is also very complex owing to the various damping and restoring systems.

It is the object of the present invention to provide a steering stabilizing means that solves the problems occurring in the prior art, and in particular enables a simplification, a saving in installation space and a weight reduction of the chassis of the commercial vehicle.

SUMMARY OF THE INVENTION

According to the invention, the actuating unit comprises a housing, a first transmission element and a second transmission element, wherein the first transmission element and the second transmission element are introduced into the housing from the outside and can be displaced along a restoring axis, wherein the first transmission element engages a first pressure element at the first end of the first transmission element and wherein the second transmission element engages a second pressure element (separate from the first pressure element) at the first end of the second transmission element, wherein the first pressure element and the second pressure element are disposed on the housing and are subjected to a restoring force acting along the restoring axis by a restoring means. The actuating unit is preferably designed as a pressure cylinder acting in two directions, wherein the first transmission element and the second transmission element can preferably be considered to be the corresponding pressure transfer or force transfer elements of the cylinder. The housing of the actuating unit is preferably disposed positionally fixedly relative to an axle element of the chassis of the commercial vehicle. The housing of the actuating unit is preferably designed to be essentially or mainly cylindrical and of a hollow body form, wherein the first transmission element preferably protrudes into a first end of the hollow-cylindrical housing and the second transmission element protrudes into the corresponding opposing end of the housing. For this purpose, the housing preferably comprises corresponding openings that particularly preferably correspond in the opening cross-section thereof to the respective external geometry of the corresponding sections of the first and second transmission elements, which are pushed through the opening. On the first end thereof, which is preferably disposed in the housing, the first transmission element and the second transmission element each comprise a pressure element or are in contact with or engage a pressure element, which is preferably entirely disposed within the interior of the housing. In this case, the first transmission element can preferably be fixed onto the first pressure element against transverse movement relative to the first pressure element and can thereby be to some extent pivotable relative to the first pressure element. Similarly, the second transmission element is preferably secured against transverse movement in particular along the restoring axis and is fixed on the second pressure element so as to be pivotable within a certain angular range. Owing to the pivotability of the first transmission element and of the second transmission element on the respective pressure element, it can in particular be achieved that in the case of slight pendulum movement of the transmission elements in combination with further systems of the chassis, in particular the steering rod, said movement is balanced out and jamming of the pressure elements in the housing of the actuating unit does not occur. Furthermore, a restoring means is disposed in the interior of the housing of the actuating unit that acts on both pressure elements in order to space the pressure elements apart from each other. In this case, the force transferred from the restoring means to the pressure elements acts essentially along a restoring axis. In a particularly preferred case, if the first pressure element together with the first transmission element is displaced along the restoring axis into the housing of the actuating unit, the restoring means acts on the first pressure element with a force acting opposite to said displacement direction in order to displace the first pressure element and the first transmission element towards the end face of the housing again. Said function of the restoring means is used in particular for resetting the steering of a commercial vehicle into the neutral or rest position. In this case, the restoring means is supported on the opposing pressure element, which for its part is supported on the inner wall in the region of the end face of the housing.

In a preferred embodiment, the restoring means is under a preload in order to space the first pressure element apart from the second pressure element, wherein at least one of the transmission elements and/or pressure elements is supported on the housing and/or on a stop that is essentially disposed positionally fixedly relative to the housing. In order to ensure at all times that the actuating unit brings the self-steering axle into a neutral position, i.e. in other words the straight-ahead position, it is preferable that the restoring means is disposed in the housing under preload. In this case, in a rest position the restoring means presses the actuating unit of the first pressure element and the second pressure element in each case towards the inner walls of the housing disposed at the end face of the housing. In any operating state of the actuating unit, preferably at least one pressure element is supported on an inner wall of the housing. Alternatively preferably, one of the pressure elements is supported on the adjacent transmission element, which for its part is supported on a stop with an engagement geometry. The stop is preferably provided on the housing or on a component of the chassis that is disposed positionally fixedly relative to the housing. The stop and/or the inner wall of the housing thus advantageously limit(s) the ability of the combination of the pressure element and the transmission element to be displaced in the respective first or second direction.

The restoring means preferably comprises a spring element and/or a fluid. The advantage of a spring element, preferably in the form of a coil spring, which is disposed between the first pressure element and the second pressure element and is supported on the same, is that even in the event of a system fault of the pneumatic system of the commercial vehicle, a restoring force is exerted on the first and/or the second pressure elements and the respective connected transmission elements in order to bring the self-steering axle into the corresponding straight-ahead position. The fluid is preferably a compressible fluid, such as compressed air for example. The advantage of the use of a fluid is that on the one hand the effective restoring force can be adjusted and on the other hand the weight of the actuating unit is reduced. Depending on the demand on the actuating unit, it is thus possible within the context of the present invention in the case of higher safety requirements to use a spring element as a restoring means, and in the case of particularly high demands on the weight saving to exclusively use a fluid, such as compressed air for example, as a restoring means. In a particularly preferred embodiment, a spring element and a fluid can also be used in combination as a restoring means, both of which are disposed in the interior of the housing and at the same time act on the first pressure element and the second pressure element. In this case, the spring element can be suitably under dimensioned in order to provide a minimum restoring force only in the event of a failure of the pneumatic system, whereas during normal operation of the commercial vehicle the major part of the restoring force is applied by the fluid. Hydraulic fluid can also be used as the fluid, which is stored at the same pressure in a suitable hydraulic system in the housing of the actuating unit as well as in the corresponding hydraulic system of the commercial vehicle. Hydraulic fluid comprises a preferred high fluid friction in comparison with air when flowing through apertures and valves, which enables improved damping of movements.

The first transmission element preferably comprises a first engagement section that is disposed outside of the housing and that is designed to transmit a force to a steering rod along the restoring axis in a first direction, wherein the second transmission element comprises a second engagement that is disposed outside of the housing and is designed to transmit a force to the steering rod along the restoring axis in a second direction. The first and second engagement sections are preferably elements fixed to the respective transmission element or protrusions implemented in one piece with the transmission elements, which are suitable to transmit a force indirectly or directly to a steering rod in at least one direction in each case. In this case, the first engagement section preferably transmits a force only along a first direction. The second engagement section preferably transmits a force to the steering rod only in a second direction. In this case, the first and second directions both extend preferably parallel to the restoring axis and in opposite directions to each other. In other words, the first engagement section is designed to displace the steering rod opposite to the first direction of the first transmission element, and thereby to press the pressure element against the restoring means and thereby to transmit a restoring force from the restoring means towards the steering rod. Analogous to this, the second engagement section is designed to transmit a displacement movement of the steering rod against the second direction to the second transmission element and the pressure element, and thereby to transmit a restoring force of the restoring means to the steering rod in the second direction. Depending on in which direction along the restoring axis the steering rod is displaced relative to the housing of the actuating unit, either the first engagement section or the second engagement section preferably transmits a corresponding restoring force from the restoring means to the steering rod via the pressure element and the corresponding transmission element.

The first engagement section is preferably designed to transmit no force to the steering rod opposite to the first direction, and/or the second engagement section is preferably designed to transmit no force to the steering rod opposite to the second direction. In other words, the steering rod, or an adapter element or force transfer element that is suitably provided on the steering rod, can move freely towards the first transmission element in the first direction. Likewise, the steering rod or the adapter element suitably provided on the steering rod can move freely towards the second transmission element in the second direction. Said design of the first and the second engagement sections ensures that in the case of a steering deflection of the steering rod along the first direction, only the second engagement section transmits a force and in the case of a deflection of the steering rod in the second direction, only the first engagement section transmits a corresponding restoring force to the steering rod. It is understood in this connection that the first and the second directions are defined in each case in relation to a relative movement relative to the housing of the actuating unit.

Furthermore, the position of the first and/or second engagement sections on the respective transmission element is preferably adjustable and preferably fixed by shape-locking and/or force-locking. Owing to the adjustability of the position of the first and/or second engagement sections on the respective transmission element of the actuating unit, the geometry of the chassis of the commercial vehicle and possibly occurring tolerances can be adjusted. In a first preferred embodiment, the transmission elements preferably comprise an external thread, onto which the respective corresponding engagement section is screwed, which for example comprises an internal thread and a corresponding locknut and can be fixed in a certain position by shape-locking and force-locking. In an alternative preferred embodiment, the engagement sections are in the form of rings that can be clamped by means of a clamping element onto the respective transmission element. Particularly preferably, suitable protrusions can be provided on the transmission elements, which mark preferred attachment positions for fixing the engagement sections and ensure the shape-locking positioning of the engagement sections on the transmission elements and at the same time enable the simple assembly of the actuating unit.

In particular, a chamber is preferably formed in the housing of the actuating unit, wherein the first pressure element divides the chamber into a first volume and a second volume, wherein the second pressure element divides the chamber into the first volume and a third volume. The chamber is preferably a cavity formed in the interior of the housing, in which the first pressure element and the second pressure element are disposed. In this case, the first and second pressure elements are preferably disposed in the chamber and designed so that they divide the chamber into a first, a second and a third volume, wherein the first volume, the second volume and the third volume are separated from each other in an essentially fluid-tight manner. Essentially fluid-tight means that, considering the gap tolerances between the inner wall of the chamber and the corresponding pressure element and any fluid damping valves provided in the pressure element, no fluid can flow past the first or second pressure element from the first volume into the second or third volume and vice-versa. In other words, the first pressure element and the second pressure element preferably act as pistons between which the first volume is disposed, and each of which exposes a respective second or third volume on the side of the pressure elements facing way from the first volume in the event of a relative displacement towards each other.

In particular, during operation of the actuating unit a higher pressure preferably prevails in the first volume than in the second volume and in the third volume. In particular, in the case in which a fluid is used as a restoring means, it is provided that a higher pressure prevails in the first volume than in the second volume and in the third volume. This enables the pressure difference between the first volume and the second volume or between the first volume and the third volume to transmit a corresponding restoring force to the pressure element.

Particularly preferably, ambient air pressure prevails in the second volume and/or in the third volume during operation of the actuating unit. In order to ensure the corresponding preferred pressure difference between the first volume and the second volume or the third volume during operation of the actuating unit, the ambient air pressure is preferably provided in the second volume and/or in the third volume. In this case, the ambient air pressure can be passed into the second volume and/or the third volume by suitable bores in the end faces of the housing. The pressure prevailing in the first volume is thus preferably higher than the ambient air pressure. In this case, the flow of ambient air into and out of the second volume and/or the third volume can preferably also be ensured in the region of the openings in the housing wall, through which the first transmission element and the second transmission element pass.

In a preferred embodiment, the first pressure element comprises a first membrane and/or the second pressure element comprises a second membrane, wherein the first membrane and/or the second membrane is/are disposed or fixed in a fluid-tight manner on the inner wall of the chamber of the housing. As an alternative to designing the pressure elements as pistons that are provided in the chamber of the housing, the pressure elements can also comprise membranes, which are preferably fixed in a shape-locking or force-locking manner to the inner wall of the housing or to the inner wall of the chamber. Owing to the use of membranes, in particular frictional wear can be avoided that occurs with pistons that slide along the inner wall of the chamber and thus rub. Furthermore, by using a membrane a higher degree of fluid-tightness can be achieved than with a piston sliding in a cylinder. The actuating unit is thus preferably designed as a dual-action membrane cylinder. The housing of the actuating unit can preferably be implemented as a number of segments, wherein in each case a membrane can be fixed, preferably clamped, in the boundary region of two segments in which said segments butt against each other.

Furthermore, the housing preferably comprises an inlet for introducing a fluid into the chamber, in particular the first volume thereof. In this case, a port for connecting a pressure line is preferably provided as an inlet, comprising an external thread and being highly compatible with the pneumatic pressure lines usually used on commercial vehicles. Alternatively preferably, the inlet can also be implemented as a corresponding bore and can be provided with an internal thread or a bayonet connector in order to fix the corresponding pressure line to the housing particularly simply and securely. In particular, the pressure line is preferably fluidically connected to the air bellows of a pneumatic spring of the commercial vehicle, wherein in particular adaptation of the air pressure in the first volume of the chamber to the weight of the commercial vehicle, or rather to the weight acting on the pneumatic spring, can preferably be adjusted. This particularly preferable because in the case of greater weight of the commercial vehicle, a larger restoring force is also usually required to overcome the frictional force of the tire on the ground, wherein said increased restoring force can be achieved by a higher pressure in the first volume of the actuating unit.

Furthermore, the first pressure element and the second pressure element preferably comprise a supporting section, wherein the restoring element, which is preferably implemented as a spring element, is supported on both supporting sections. The supporting sections on the first pressure element and on the second pressure element are preferably implemented as spring plates that prevent slipping or sliding of the restoring means implemented as a spring element in a direction transverse to the restoring axis. The supporting sections are preferably provided as additional components on the pressure elements, for example as disk-shaped elements with an edge protruding towards the restoring means, which us fixed to the pressure element by means of a bolt, a screw or a rivet.

Furthermore, according to the invention a steering stabilizing means is provided, in particular for a commercial vehicle, comprising an actuating unit, a steering rod and two struts, wherein the actuating unit comprises a housing that is disposed positionally fixedly relative to an axle element, wherein the actuating unit is designed to subject both struts to the same amount of force in a rest position of the steering rod relative to the axle element, wherein the actuating unit is designed to transmit a larger force to one of the struts than to the respective other strut in the case of deflection of the steering rod from the rest position parallel to a restoring axis. The steering stabilizing means according to the invention is preferably part of a self-steering axle, with which a steering rod synchronizes the respective steering movements of the two wheel suspensions and is correspondingly displaced relative to an axle element essentially parallel to a restoring axis. Essentially parallel to the restoring axis means in the present case that owing to the circular path that the connecting points thereof describe on the respective lever in the wheel suspensions, the steering rod also carries out a displacement transverse to the restoring axis, wherein however, in the case of the present invention only a movement parallel to the restoring axis occurs. The actuating unit comprises a housing that is preferably fixed by means of suitable connecting means such as webs and/or bolts to an axle element, or is indirectly fixed to an axle element. In this case, a first strut preferably transmits a restoring force from the actuating unit to the steering rod in a first direction parallel to the restoring axis. The second strut of the steering stabilizing means is preferably designed to transmit a restoring force from the actuating unit to the steering rod along a second direction. The struts preferably extend essentially transverse and particularly preferably essentially perpendicular to the restoring axis and are either fixed to the steering rod or to a transmission element.

In a preferred embodiment, the actuating unit is disposed on the same side of the axle element as the steering rod. This enables a particularly compact design of the steering stabilizing means and thereby of the chassis of the commercial vehicle to be implemented. By disposing the actuating unit very close to the steering rod, short and hence light struts can preferably particularly also be used, whereby the weight and the necessary installation space of the steering stabilizing means can be reduced. In a particularly preferred embodiment, the actuating unit is disposed exactly between the steering rod and the axle element. This enables both the attachment region of the actuating unit to the axle element and also the struts, which are provided between the transmission elements of the actuating unit and the steering rod, to be designed as short as possible, whereby the weight is reduced.

In a preferred embodiment of the steering stabilizing means, the actuating unit comprises a chamber in which a fluid is disposed such that the actuating unit damps a displacement of the steering rod relative to the axle element by fluid friction. Besides the essential task of providing a restoring force, which is applied by the actuating unit, it is furthermore preferable that the actuating unit also damps the displacement and thereby in particular the displacement movement of the steering rod relative to the axle element. This enables oscillations that can occur on the self-steering axle, in particular during rapid straight-line travel of the commercial vehicle, to be effectively damped by the actuating unit. The advantage in this is case that an additional damper on the chassis system can be saved by the use of an actuating unit according to the invention. In order to produce fluid friction in the actuating unit and/or in fluid lines bounding on the actuating unit, orifices and/or valves are preferably provided, through which the fluid is forced into the chamber of the actuating unit in the event of displacement of the pressure elements, wherein fluid friction occurs and hence kinetic energy of the steering rod is converted into heat. Damping of the displacement of the steering rod takes place through this. Particularly preferably, such an orifice or valve is provided in the region of the inlet, which is preferably disposed on the housing of the actuating unit. In the event of a steering deflection, the steering rod is preferably displaced in the first or in the second direction of one of the pressure elements in the chamber of the housing of the actuating unit, whereby a first volume disposed between the first pressure element and the second pressure element reduces, wherein the fluid provided therein flows out from the first volume through the inlet opening and in doing so passes the corresponding orifice or the corresponding valve, wherein fluid friction occurs. If the cornering of the commercial vehicle ends, the compressed air system of the commercial vehicle forces fluid into the first volume, whereby the respective previously displaced pressure element is forced back into the initial position thereof, wherein fluid friction occurs again during the inflow of the fluid through the inlet, and hence the displacement of the steering axle to the rest position also takes place with energy losses in the steering stabilizing means, which is equivalent to damping of the potential pressure energy and kinetic energy in the system.

In a preferred embodiment, the struts are fixed to the steering rod spaced apart from each other, wherein the first strut engages a first transmission element of the actuating unit, wherein the second strut engages a second transmission element of the actuating unit, wherein a displacement of the steering rod from the rest position in a first direction forces the second strut of the second transmission element into the housing, wherein in the event of displacement of the steering rod from the rest position in a second direction, the first strut forces the first transmission element into the housing. In other words, the engagement between the respective transmission element and the respective strut engaging the same acts only in one direction along the restoring axis or parallel to the restoring axis. In this way, only one of the transmission elements is forced into the actuating unit depending on the direction of the deviation of the steering rod relative to the axle element. In this case, preferably only the pressure element that is fixed to the transmission element that is subjected to a force by the strut is displaced towards the restoring means. The other pressure element and thus the respective other transmission element connected to the same are supported on the inner wall of the housing of the actuating unit during this process. Particularly preferably, in this case the first strut and/or the second strut can be fixed to the steering rod via a bonded joint or preferably even a force-locking joint. The advantage of a bonded joint is the high strength and reliability of the joint between the strut the and the steering rod. A force-locking joint can in particular be preferable if disassembly of the joint of the steering rod and the strut is to be provided.

In an alternative preferred embodiment, the first strut is or can be fixed to a first transmission element of the actuating unit, wherein the second strut is or can be fixed to a second transmission element of the actuating unit, wherein the steering rod comprises a first engagement section on the steering side and a second engagement section on the steering side, which are fixed to the steering rod or are preferably provided, wherein in the event of displacement of the steering rod from the rest position in a first direction, the second engagement section on the steering side forces the second transmission element into the housing by means of the second strut, wherein in the event of displacement of the steering rod from the rest position in a second direction, the first engagement section on the steering side forces the first transmission element into the housing by means of the first strut. As an alternative to the previously described embodiment, the struts can thus also be fixed to the transmission elements of the actuating unit, wherein instead of the engagement section provided on the transmission elements, engagement sections on the steering side are now provided on the steering rod. The advantage of said embodiment is that the actuating unit together with the struts can be provided as a preassembled unit, wherein following mounting of the actuating unit and the steering rod in the chassis of the commercial vehicle, the engagement sections on the steering side can be subsequently fixed to the steering rod and can be adjusted in the correct position on the steering rod.

Particularly preferably, the actuating unit used in the steering stabilizing means further comprises the previously described features of preferred embodiments of the actuating unit.

BRIEF DESCRIPTION OF THE DRAWINGS

Further advantages and features of the present invention are revealed in the following description of preferred embodiments with reference to the accompanying figures. It will be understood that individual features that are only shown in one or a selection of embodiments can also be used in further embodiments, in particular if the reference characters of the features are the same and the feature is not prohibited in the corresponding embodiment for technical reasons. In the figures:

FIGS. 4A, 4B show a preferred embodiment of the actuating unit according to the invention, wherein FIG. 4A shows the rest position and FIG. 4B shows a first deflected position.

DETAILED DESCRIPTION OF THE PREFERRED EMBODIMENTS

Figure 1:
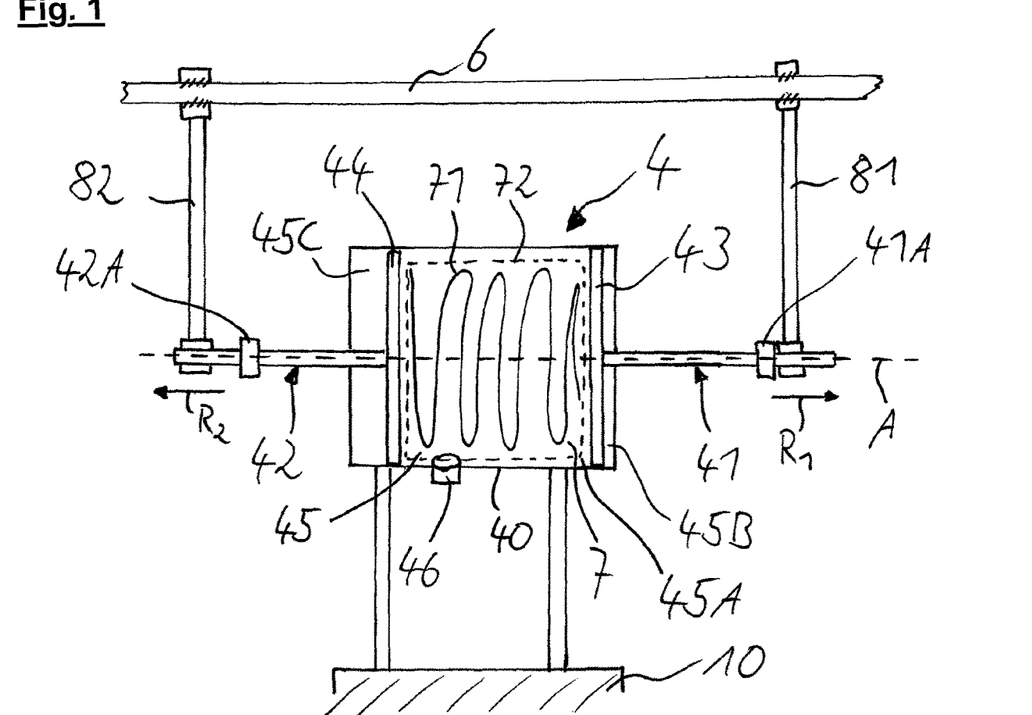
FIG. 1 shows a schematic view of a preferred embodiment of the steering stabilizing means according to the invention.

The steering stabilizing means or arrangement shown in FIG. 1 comprises a steering rod 6, an actuating unit 4 and an axle element 10. The actuating unit 4 is made up of a housing 40, a first transmission element 41, a second transmission element 42 as well as a restoring means 7 disposed in the interior of the housing 40. In order to enable a favorable transmission of force from the restoring means 7 to the transmission elements 41, 42, the transmission elements 41, 42 each comprise a pressure element 43, 44. The pressure elements 43, 44 are preferably entirely disposed within a chamber 45 formed in the housing 40. In this case, the first pressure element 43 divides the chamber 45 preferably into a first volume 45A and a second volume 45B. Analogous to this, the second pressure element 44 preferably divides the chamber 45 into a third volume 45C and the first volume 45A. The first and second transmission elements 41, 42 can be displaced along a restoring axis A relative to the housing 40, wherein in the case of a displacement of the first transmission element 41 or the second transmission element 42 into the housing 40, the restoring means 7 is compressed in each case by the narrowing of the first volume or by the reduction of the distance between the first pressure element 43 and the second pressure element 44. Said compression of the restoring means causes a restoring force which is transmitted from the restoring means 7 to the pressure elements 43, 44. Owing to said restoring force, the actuating unit 4 ensures that a steering deflection of the steering rod 6 relative to the axle element 10 following termination of the steering process or the cornering of the commercial vehicle is returned to a rest position or neutral position of the steering rod 6. A failure element 71 and/or a fluid 72 is/are preferably used as the restoring means 7. The fluid 72 is preferably compressed air, because this is particularly simple to provide and can be obtained at any time from the surroundings or from the pneumatic air suspension system of a commercial vehicle and hence is conveniently and reproducibly available. For coupling the first volume 45A in the chamber 45 to the compressed air system of the commercial vehicle, the housing 40 preferably comprises an inlet 46. A compressed air line can be connected to said inlet 46, particularly preferably by means of a standard thread, wherein the compressed air line is preferably connected to the air spring bellows and the compressed air disposed therein in order to also provide the fluid 72 with a pressure adjusted depending on the weight of the commercial vehicle and on the resulting higher or lower pressure in the air springs. The first transmission element 41 comprises a first engagement section 41A, which on the one hand designed to a pass on a displacement of the steering rod in a second direction $R_2$ to the first transmission element 41 and on the other hand to transmit the restoring force of the restoring means 7 acting on the transmission element 41 in turn to the steering rod 6. Furthermore, a first strut 81, which in the preferred embodiment of FIG. 1 is fixed to the steering rod, is used for further transmission of the force between the transmission element 41 and the steering rod 6. The first strut 81 and the second strut 82 as well as the first engagement section 41A and the second engagement section 42A are in this case positioned on the steering rod and the transmission elements 41, 42 such that in the event of displacement of the steering rod 6 in the first direction $R_1$ or in the second direction $R_2$, a respective transmission element 41 or 42 is forced into the housing 40 of the actuating unit 4, whereas the respective other transmission element 41, 42 of the respective strut 81, 82 allows free movement in the direction in which the steering rod 6 is moving relative to the axle element 10.

Figure 2:
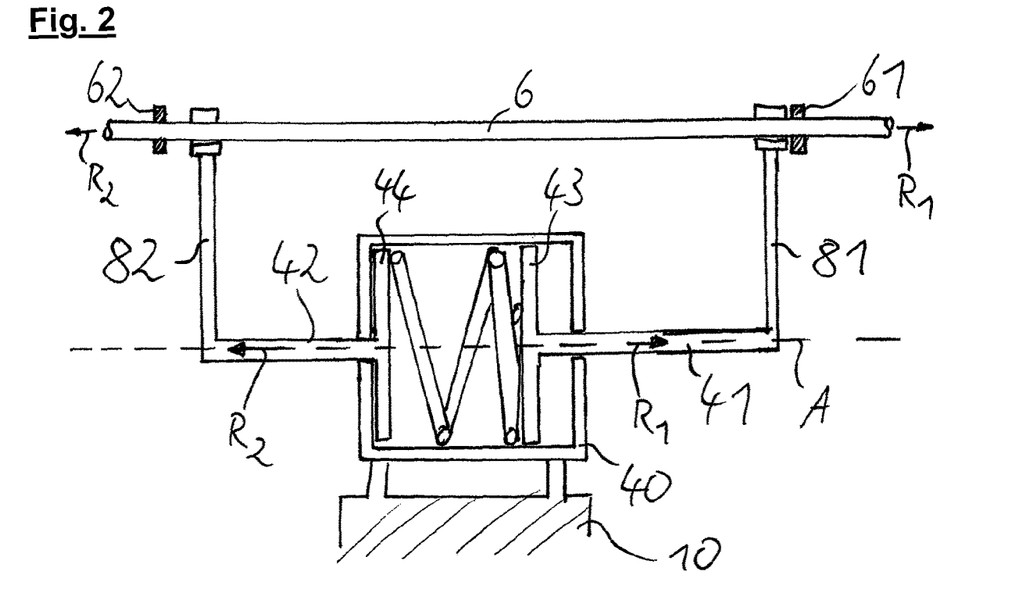
FIG. 2 shows an alternative preferred embodiment of the steering stabilizing means according to the invention.

FIG. 2 shows a further embodiment of the steering stabilizing means, wherein in contrast to the embodiment shown in FIG. 1, the struts 81, 82 are not fixed to the steering rod 6, but to the transmission elements 41, 42. For the transmission of force from the transmission elements 41, 42 to the steering rod 6 and vice-versa, the steering rod comprises a first engagement section 61 on the steering side and a second engagement section 62 on the steering side, which are designed similarly to the engagement sections 41A and 42A in FIG. 1 to transmit a force of the actuating unit 4 to the steering rod 6 and vice-versa.

Figure 3A:
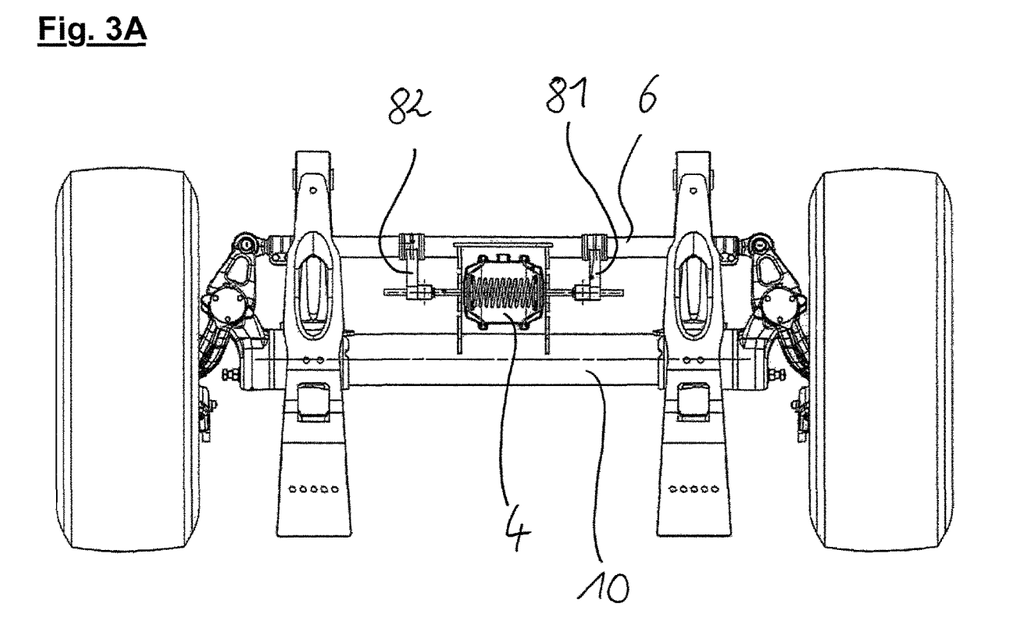
FIG. 3A shows a partially sectional view of a preferred embodiment of a steering stabilizing means according to the invention in a rest position.
Figure 3B:
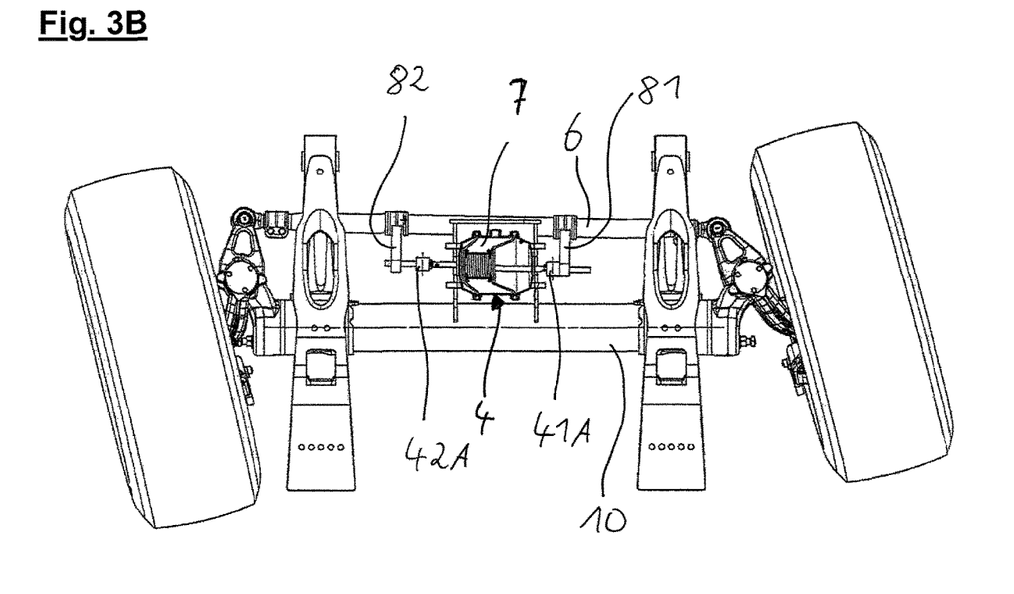
FIG. 3B shows a partially sectional view of the preferred embodiment of FIG. 3A in a first deflected position.
Figure 4A:
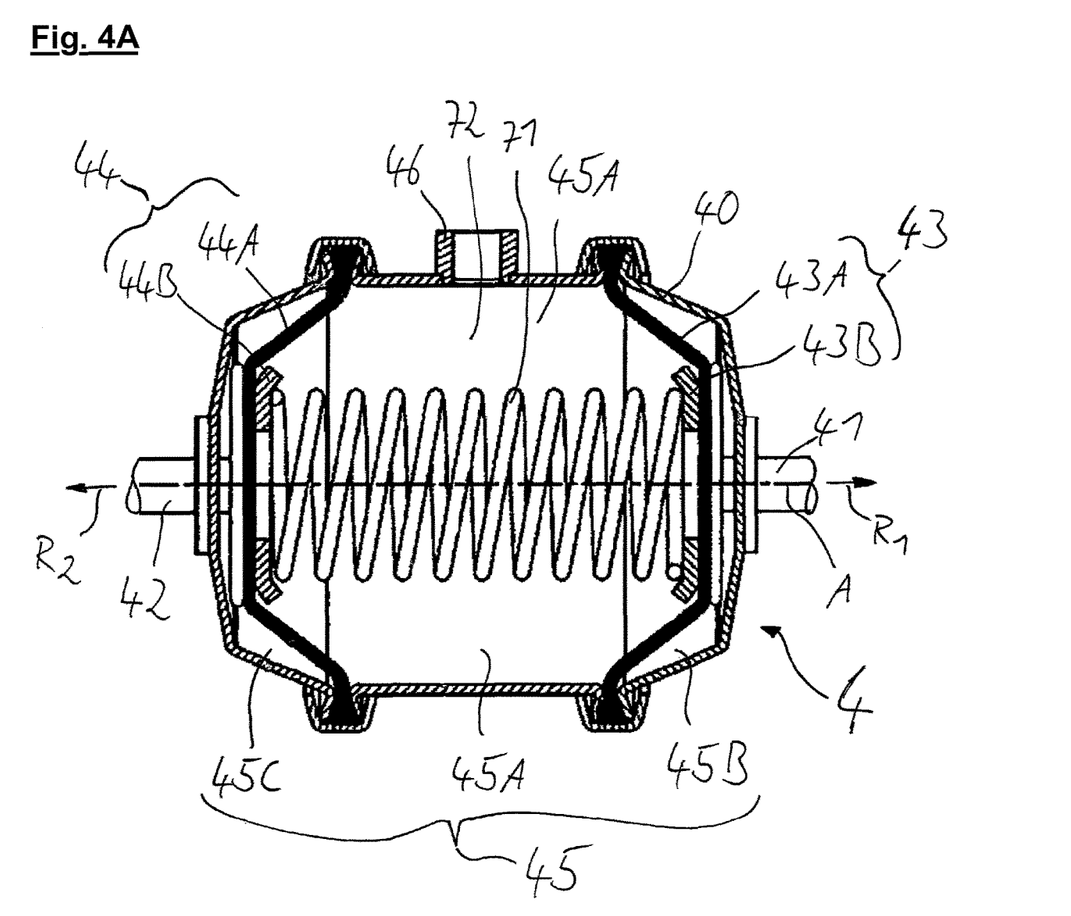
Figure 4B:
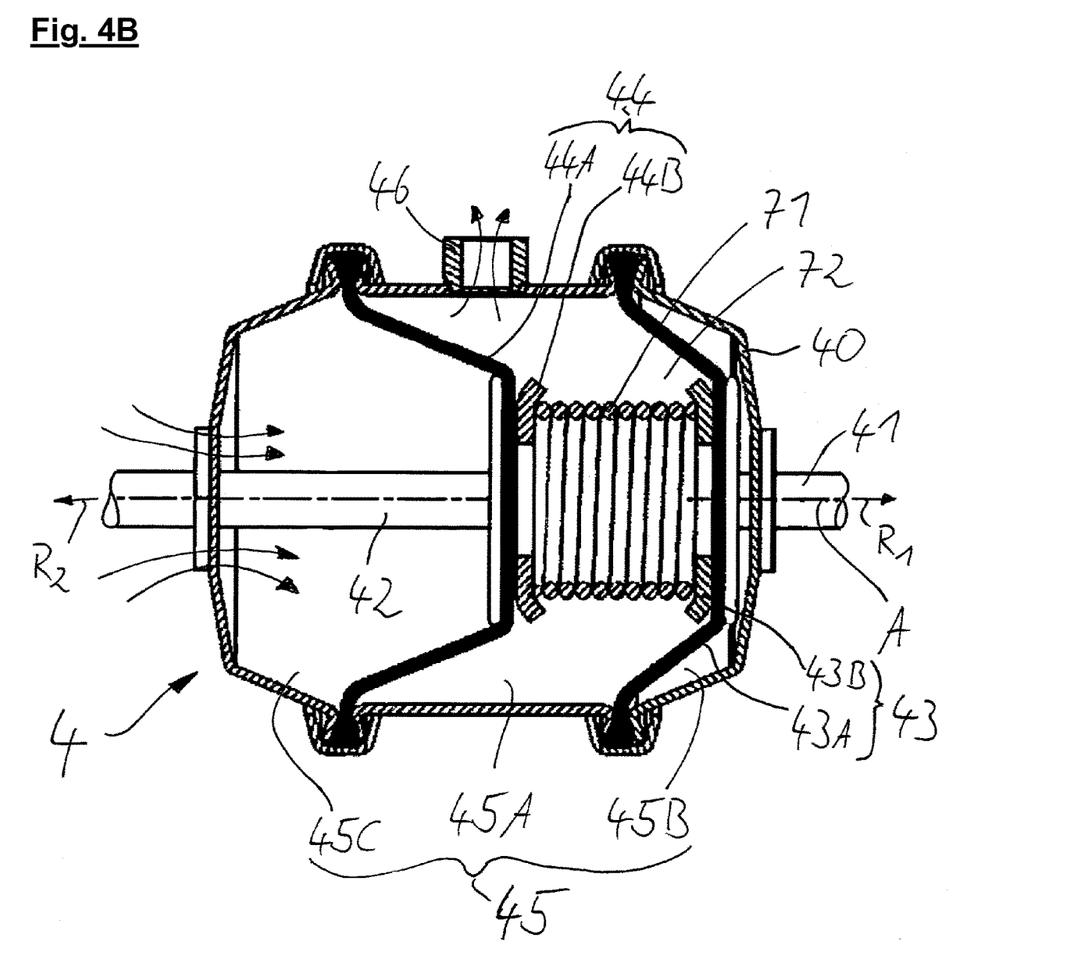

FIG. 3A shows a partly sectional top view of a preferred embodiment of the steering stabilizing means with the adjacent elements and systems of the chassis of the commercial vehicle. In the case of the self-steering axle represented, the straight-ahead direction runs upwards in the figure. FIG. 3A shows the rest position for this, i.e. the position of the steering rod 6 for straight-line travel, whereas FIG. 3B shows the position of the steering stabilizing means during cornering. With the straight-ahead position shown in FIG. 3A of the actuating unit and the steering rod 6, the first strut 81 and the second strut 82 are preferably subjected to the same force by the transmission elements 41, 42 (see FIG. 1 or FIG. 4A) of the actuating unit 4, whereby the steering axle and thereby also the wheels of the commercial vehicle are held in the straight-ahead position. In the case of the position shown in FIG. 3B of the steering stabilizing means when cornering, only the first strut 81 engages the corresponding first engagement section 41A of the first transmission element 41, whereas the second strut 82 is spaced apart from the second engagement section 42A as it runs freely along the second transmission element 42. At the same time, in the chamber of the actuating unit 4 the restoring means 7 is correspondingly displaced to the left and is subjected to a force, wherein the restoring means 7 acts with a restoring force on the first transmission element 41 and thus on the first strut 81. The details of the actuating unit 4 in the neutral position or straight-ahead travel position as well as in the cornering position are shown in FIGS. 4A and 4B. in the case of the embodiment shown in FIG. 3A and FIG. 3B, the first transmission element 41 and the second transmission element 42 are preferably implemented as threaded rods, at least in the region in which the first engagement section 41A or the second engagement section 42A engages, wherein the first engagement section 41A as well as the second engagement section 42A preferably comprises an internal thread that can be screwed onto the transmission element 41 and secured in a certain position, for example tightened. This enables the actuating unit 4 and the engagement thereof with the steering rod 6 to be adjusted using fewer hand actions.

FIG. 4A shows the actuating unit 4 in the straight-ahead position already shown in FIG. 3A. As further details of the actuating unit 4, it is shown that the pressure elements 43 and 44 comprise a first and a second membrane 43A, 44A and preferably also a first and a second supporting section 43A and 44A. The first membrane 43A is used in this case to divide the chamber 45 in the housing 40 of the actuating unit 4 into a first volume 45A and a second volume 45B. The first supporting section 43B is used to support the spring element 71, wherein it comprises a collar-shaped edge that prevents the spring element 71 from slipping transversely to the restoring axis A. Analogous to this, the second pressure element 44 comprises a second membrane 44A that separates a third volume 45C from the first volume 45A. Particularly preferably, the first volume 45A is fluidically connected via the inlet 46 to the compressed air system of the commercial vehicle. In particular, in this case a higher pressure preferably prevails in the first volume 45A than in the second volume 45B and than in the third volume 45C. The overpressure in the first volume 45A as well as the spring element 71 both subject the first pressure element 43 and also the second pressure element 44 to a force that tends to space the two pressure elements 43, 44 apart from each other. In the straight-ahead position of the actuating unit 4, the first pressure element 43 and the second pressure element 44 are each supported on the end faces, which means in other words on the inner walls of the housing 40 of the actuating unit 4 shown on the right and left in the figure. In other words, the restoring means 7, which in the embodiment shown in FIG. 4A preferably comprises a spring element 71 and a fluid 72, acts on the first pressure element 43 in a first direction $R_1$ and the second pressure element 44 in a second direction $R_2$. In the transition region to the rod-shaped region of the first or second transmission elements 41, 42 the first pressure element 43 as well as the second pressure element 44 each comprises a plate-shaped section that supports the membrane 43A, 44A in particular. The first membrane 43A as well as the second membrane 44A are preferably made of a rubber material. In particular, a fiber-reinforced rubber material can preferably also be used for this in order to be able to withstand the large forces acting in the actuating unit 4.

FIG. 4B shows the actuating unit in the state in which the steering rod 6 is in a deflected position relative to the axle element 10 (not shown), wherein the second transmission element 42 is forced along the restoring axis A into the chamber 45 of the actuating unit 4. It is shown schematically that in this case ambient air flows into the third volume 45C in order to fill the space increased by the displacement of the second pressure element 44 on the one hand. On the other hand, the space of the first volume 45A decreases, wherein the compressed air disposed there escapes through the inlet opening 46 into the compressed air system of the commercial vehicle and the spring element 71 between the first pressure element 43 and the second pressure element 44 is compressed. In the state shown in FIG. 4B, the first pressure element 43 is supported on the right side of the housing 40 of the actuating unit 4 in the figure. Once the restoring force of the restoring means 7 overcomes the force transferred to the second transmission element 42 from the steering rod, the second transmission element 42 is displaced back in the left direction in the figure, until finally the rest position of the actuating unit shown in FIG. 4A is reached. Instead of the membranes 43A and 44A shown in FIGS. 3A, 3B, 4A and 4B, the pressure elements could also be implemented as simple pistons that slide in the interior of the chamber 45 of the actuating unit 4 and accordingly bound the first volume 45A.

REFERENCE CHARACTER LIST

4—actuating unit
6—steering rod
7—restoring means
10—axle element
40—housing
41—first transmission element
41A—first engagement section
42—second transmission element
42A—second engagement section
43—first pressure element
43A—first membrane
43B—first supporting section
44—second pressure element
44A—second membrane
44B—second supporting section
45—chamber
45A—first volume
45B—second volume
45C—third volume
46—inlet
61—first engagement section on the steering side
62—second engagement section on the steering side
71—spring element
72—fluid
81—first strut
82—second strut
A—restoring axis
$R_1$—first direction
$R_2$— second direction

The invention claimed is:
1. An actuating unit for use in a steering stabilizing apparatus, comprising:
   a housing;
   a first transmission element; and
   a second transmission element;
   wherein the first transmission element and the second transmission element protrude into the housing from an outside and are configured to be displaced along a restoring axis;
   wherein the first transmission element engages a first pressure element at a first end of the first transmission element and wherein the second transmission element engages a second pressure element at a first end of the second transmission element;
   wherein the first pressure element and the second pressure element are disposed entirely within an interior of the housing and are subjected by a restoring arrangement to a restoring force acting along the restoring axis;
   wherein the first transmission element comprises a first engagement section that is disposed outside of the housing and that is configured to transmit a force to a steering rod along the restoring axis in a first direction, and wherein the second transmission element comprises a second engagement section that is disposed outside of the housing and that is configured to transmit a force to the steering rod along the restoring axis in a second direction; and
   wherein the first engagement section is configured to transmit no force to the steering rod opposite to the first direction, and/or wherein the second engagement sec- tion is designed to transmit no force to the steering rod opposite to the second direction.

2. The actuating unit as claimed in claim 1, wherein the restoring arrangement comprises at least one of a spring element and a fluid.

3. The actuating unit as claimed in claim 1, wherein a chamber is formed in the housing, wherein the first pressure element divides the chamber into a first volume and a second volume, and wherein the second pressure element divides the chamber into the first volume and a third volume.

4. The actuating unit as claimed in claim 1, wherein a position of at least one of the first and the second engagement section is adjustable and is configured to be fixed by at least one of shape locking and force locking.

5. The actuating unit as claimed in claim 4, wherein ambient air pressure prevails in at least one of the second volume and in the third volume during operation of the actuating unit.

6. The actuating unit as claimed in claim 1, wherein the restoring arrangement is under a preload in order to space the first pressure element apart from the second pressure element, wherein at least one of the transmission elements and the pressure elements is supported on at least one of the housing and a stop that is disposed substantially positionally fixedly relative to the housing.

7. The actuating unit as claimed in claim 6, wherein the restoring arrangement comprises at least one of a spring element and a fluid.

8. The actuating unit as claimed in claim 6, wherein the position of at least one of the first and the second engagement section is adjustable and is configured to be fixed by at least one of shape locking and force locking.

9. The actuating unit as claimed in claim 8, wherein a chamber is formed in the housing, wherein the first pressure element divides the chamber into a first volume and a second volume, and wherein the second pressure element divides the chamber into the first volume and a third volume.

10. An actuating unit for use in a steering stabilizing apparatus, comprising:
a housing;
a first transmission element; and
a second transmission element;
wherein the first transmission element and the second transmission element protrude into the housing from an outside and are configured to be displaced along a restoring axis;
wherein the first transmission element engages a first pressure element at a first end of the first transmission element and wherein the second transmission element engages a second pressure element at a first end of the second transmission element;
wherein the first pressure element and the second pressure element are disposed entirely within an interior of the housing and are subjected by a restoring arrangement to a restoring force acting along the restoring axis;
wherein the restoring arrangement is under a preload in order to space the first pressure element apart from the second pressure element, wherein at least one of the transmission elements and the pressure elements is supported on at least one of the housing and a stop that is disposed substantially positionally fixedly relative to the housing;
wherein the restoring arrangement comprises at least one of a spring element and a fluid;
wherein the first transmission element comprises a first engagement section that is disposed outside of the housing and that is configured to transmit a force to a steering rod along the restoring axis in a first direction, and wherein the second transmission element comprises a second engagement section that is disposed outside of the housing and that is configured to transmit a force to the steering rod along the restoring axis in a second direction;
wherein a position of at least one of the first and the second engagement section is adjustable and is configured to be fixed by at least one of shape locking and force locking;
wherein a chamber is formed in the housing, wherein the first pressure element divides the chamber into a first volume and a second volume, and wherein the second pressure element divides the chamber into the first volume and a third volume; and
wherein a higher pressure prevails in the first volume than in the second volume and in the third volume during operation of the actuating unit.

11. The actuating unit as claimed in claim 10, wherein ambient air pressure prevails in at least one of the second volume and in the third volume during operation of the actuating unit.

12. The actuating unit as claimed in claim 11, wherein at least one of the first pressure element comprises a first membrane and the second pressure element comprises a second membrane, and wherein the first membrane and the second membrane is disposed on the inner wall of the chamber of the housing in a fluid-tight manner.

13. The actuating unit as claimed in claim 12, wherein the first pressure element and the second pressure element each comprise a supporting section, and wherein the restoring arrangement includes a spring element that is supported on both of the supporting sections.

14. A steering stabilizing apparatus for a commercial vehicle, comprising:
an actuating unit;
a steering rod; and
two struts;
wherein the actuating unit comprises a housing that is disposed positionally fixedly relative to an axle element;
wherein the actuating unit is configured to subject both of the struts with a magnitude of a force with the steering rod in a rest position relative to the axle element;
wherein the struts are configured to transmit the force between the actuating unit and the steering rod;
wherein the actuating unit is configured, in an event of deflection of the steering rod from the rest position parallel to a restoring axis, to transmit a larger force to one of the struts than to the respective other strut when the steering rod is deflected from the rest position parallel to the restoring axis; and
wherein the first strut is fixed for movement with the steering rod.

15. The steering stabilizing apparatus as claimed in claim 14, wherein the actuating unit comprises a chamber in which a fluid is disposed such that the actuating unit damps a displacement of the steering rod relative to the axle element by fluid friction.

16. The steering stabilizing apparatus as claimed in claim 14, wherein the struts are fixed to the steering rod and spaced apart from each other;
wherein a first strut of the struts engages a first transmission element of the actuating unit;
wherein a second strut of the struts engages a second transmission element of the actuating unit;

wherein in the event of deflection of the steering rod from the rest position in a first direction, the second strut forces the second transmission element into the housing, and wherein in the event of deflection of the steering rod from the rest position in a second direction, the first strut forces the first transmission element into the housing.

17. The steering stabilizing apparatus as claimed in claim 14, wherein the actuating unit is disposed on a same side of the axle element as the steering rod.

18. The steering stabilizing apparatus as claimed in claim 17, wherein the actuating unit comprises a chamber in which a fluid is disposed such that the actuating unit damps a displacement of the steering rod relative to the axle element by fluid friction.

19. The steering stabilizing apparatus as claimed in claim 18, wherein the struts are fixed to the steering rod and spaced apart from each other;

wherein a first strut of the struts engages a first transmission element of the actuating unit;

wherein a second strut of the struts engages a second transmission element of the actuating unit;

wherein in the event of deflection of the steering rod from the rest position in a first direction, the second strut forces the second transmission element into the housing, and wherein in the event of deflection of the steering rod from the rest position in a second direction, the first strut forces the first transmission element into the housing.

20. An actuating unit for use in a steering stabilizing apparatus, comprising:

a housing;

a first transmission element; and a second transmission element;

wherein the first transmission element and the second transmission element protrude into the housing from an outside and are configured to be displaced along a restoring axis;

wherein the first transmission element engages a first pressure element at a first end of the first transmission element and wherein the second transmission element engages a second pressure element at a first end of the second transmission element;

wherein the first pressure element and the second pressure element are disposed entirely within an interior of the housing and are subjected by a restoring arrangement to a restoring force acting along the restoring axis;

wherein a chamber is formed in the housing, wherein the first pressure element divides the chamber into a first volume and a second volume, and wherein the second pressure element divides the chamber into the first volume and a third volume; and wherein a higher pressure prevails in the first volume than in the second volume and in the third volume during operation of the actuating unit.

21. An actuating unit for use in a steering stabilizing apparatus, comprising:

a housing;

a first transmission element; and a second transmission element;

wherein the first transmission element and the second transmission element protrude into the housing from an outside and are configured to be displaced along a restoring axis;

wherein the first transmission element engages a first pressure element at a first end of the first transmission element and wherein the second transmission element engages a second pressure element at a first end of the second transmission element;

wherein the first pressure element and the second pressure element are disposed entirely within an interior of the housing and are subjected by a restoring arrangement to a restoring force acting along the restoring axis;

wherein a position of at least one of the first and the second engagement section is adjustable and is configured to be fixed by at least one of shape locking and force locking; and wherein at least one of the first pressure element comprises a first membrane and the second pressure element comprises a second membrane, and wherein the first membrane and the second membrane is disposed on an inner wall of a chamber of the housing in a fluid-tight manner.

22. An actuating unit for use in a steering stabilizing apparatus, comprising:

a housing;

a first transmission element; and a second transmission element;

wherein the first transmission element and the second transmission element protrude into the housing from an outside and are configured to be displaced along a restoring axis;

wherein the first transmission element engages a first pressure element at a first end of the first transmission element and wherein the second transmission element engages a second pressure element at a first end of the second transmission element;

wherein the first pressure element and the second pressure element are disposed entirely within an interior of the housing and are subjected by a restoring arrangement to a restoring force acting along the restoring axis; and wherein the first pressure element and the second pressure element each comprise a supporting section, and wherein the restoring arrangement includes a spring element that is supported on both of the supporting sections.

* * * * *

UNITED STATES PATENT AND TRADEMARK OFFICE
CERTIFICATE OF CORRECTION

PATENT NO. : 10,689,032 B2
APPLICATION NO. : 15/549004
DATED : June 23, 2020
INVENTOR(S) : Khoury It is certified that error appears in the above-identified patent and that said Letters Patent is hereby corrected as shown below:

In the Specification

Column 3, Lines 51-52:
After "engagement" insert -- section --

Column 5, Line 15:
"way" should be — away —

Column 6, Line 16:
After "This" insert -- is --

Column 6, Line 34:
"us" should be — is —

Column 8, Line 23:
Delete "the" (3rd occurrence)

Column 10, Line 2:
After "hand" insert -- is --

Column 10, Line 59 (2nd occurrence):
"in" should be — In —

In the Claims

Column 13, Claim 4, Line 14:
"shape locking and force locking" should be — shape-locking and force-locking —

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,689,032 B2

Column 13, Claim 8, Line 32:
"shape locking and force locking" should be — shape-locking and force-locking —

Column 14, Claim 10, Lines 9-10:
"shape locking and force locking" should be — shape-locking and force-locking —

Column 14, Claim 12, Line 28:
"is" should be — are —

Column 15, Claim 16, Line 17:
"," should be — ; —

Column 15, Claim 19, Line 26:
"," should be — ; —

Column 16, Claim 21, Lines 22-23:
"shape locking and force locking" should be — shape-locking and force-locking —

Column 16, Claim 21, Line 27:
"is" should be — are —